(12) United States Patent
Hall

(10) Patent No.: US 12,016,271 B2
(45) Date of Patent: Jun. 25, 2024

(54) WEED SEED DESTRUCTION WITH IMPROVED WEAR CHARACTERISITICS

(71) Applicant: Dean Mayerle, Saskatoon (CA)

(72) Inventor: Brandon A. Hall, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 330 days.

(21) Appl. No.: 17/166,254

(22) Filed: Feb. 3, 2021

(65) Prior Publication Data

US 2021/0282329 A1    Sep. 16, 2021

Related U.S. Application Data

(60) Provisional application No. 62/988,514, filed on Mar. 12, 2020.

(51) Int. Cl.
*A01F 12/40* (2006.01)
*A01D 41/12* (2006.01)

(52) U.S. Cl.
CPC .......... *A01F 12/40* (2013.01); *A01D 41/1243* (2013.01)

(58) Field of Classification Search
CPC ... A01F 12/40; A01D 41/1243; B02C 13/205; B02C 2021/023
See application file for complete search history.

(56) References Cited

U.S. PATENT DOCUMENTS

| | | | |
|---|---|---|---|
| 1,927,277 A * | 9/1933 | Canary ............... | B02C 13/1814 241/154 |
| 2,064,689 A | 12/1936 | Russwurm | |
| 2,156,321 A * | 5/1939 | Sutherland, Jr. .......... | B02C 7/06 241/261.3 |
| 2,557,865 A * | 6/1951 | Emmanouilidis ..... | B02C 13/284 241/189.1 |
| 2,775,174 A | 12/1956 | Petrick | |
| 2,919,864 A * | 1/1960 | Parmele ................ | B02C 13/205 241/300 |
| 3,047,243 A * | 7/1962 | Meger ................... | B29C 48/022 241/188.1 |
| 3,071,246 A | 1/1963 | Schimke | |

(Continued)

FOREIGN PATENT DOCUMENTS

| AU | A-37966/95 | 5/1996 |
|---|---|---|
| AU | 200138781 | 10/2001 |

(Continued)

*Primary Examiner* — Thomas B Will
*Assistant Examiner* — Julia C Tran
(74) *Attorney, Agent, or Firm* — Adrian D. Battison; Ade & Company Inc.; Ryan W. Dupuis

(57) ABSTRACT

Weed seeds are destroyed in the chaff from a combine harvester by repeated high speed impacts caused by a rotor mounted in one of a pair of side by side housings which accelerate the discarded seeds into contact with stator bars at angularly spaced positions around the axis of the rotor. U-shaped bars are symmetrical and can be reversed when the second leg is worn for extended life. Parts of the rotor and stator which are radially outward of other parts are formed with a higher resistance to wear approximately proportional to the radius so that the wear characteristics of the different parts are matched to the velocity of the particles impacting the different portions to generate symmetrical wear throughout the structure.

6 Claims, 14 Drawing Sheets

(56) References Cited

U.S. PATENT DOCUMENTS

| | | | |
|---|---|---|---|
| 3,411,724 A * | 11/1968 | Noe | B02C 13/205 241/197 |
| 3,448,933 A | 6/1969 | Roy | |
| 3,503,561 A * | 3/1970 | Oscar | B02C 13/205 241/197 |
| 3,576,655 A * | 4/1971 | Hint | C04B 28/18 106/797 |
| 3,659,793 A * | 5/1972 | Stephenson | B02C 13/22 241/197 |
| 3,771,734 A * | 11/1973 | Stephenson | B02C 13/205 241/188.1 |
| 3,894,695 A * | 7/1975 | Benedikter | B02C 13/205 241/188.1 |
| 4,307,845 A * | 12/1981 | Larimer | B02C 13/2804 241/294 |
| 4,378,911 A * | 4/1983 | Adams | B02C 13/282 241/285.2 |
| 4,406,409 A * | 9/1983 | Durek | B02C 13/205 241/39 |
| 4,580,736 A * | 4/1986 | Takahashi | B02C 13/205 241/197 |
| 4,591,102 A | 5/1986 | Clarke | |
| 4,637,406 A | 1/1987 | Guinn | |
| 4,711,253 A | 12/1987 | Anderson | |
| 4,728,047 A * | 3/1988 | Shagarova | B02C 13/205 241/188.1 |
| 4,917,652 A | 4/1990 | Glaubitz | |
| 4,923,431 A | 5/1990 | Miller | |
| 5,009,371 A * | 4/1991 | Nickel | B02C 13/205 241/188.1 |
| 5,425,507 A | 6/1995 | Stumpff | |
| 5,556,042 A | 9/1996 | Roberg | |
| 5,944,604 A | 8/1999 | Niermann | |
| 6,500,064 B1 | 12/2002 | Schrattenecker | |
| 6,547,169 B1 | 4/2003 | Matousek | |
| 6,656,038 B1 | 12/2003 | Persson | |
| 6,685,558 B2 | 2/2004 | Niermann | |
| 6,840,854 B2 | 1/2005 | Redekop | |
| 6,908,379 B2 | 6/2005 | Gryspeerdt | |
| 8,152,610 B2 | 4/2012 | Harrington | |
| 8,167,691 B2 | 5/2012 | Pohlmann | |
| 8,210,915 B2 | 7/2012 | Holmen | |
| 8,789,785 B2 | 7/2014 | Lelas | |
| 9,497,903 B2 | 11/2016 | Biggerstaff | |
| 9,635,813 B2 | 5/2017 | Dilts | |
| 9,686,916 B2 | 6/2017 | Biggerstaff | |
| 9,723,790 B2 | 8/2017 | Berry | |
| 9,730,390 B2 | 8/2017 | Maes | |
| 9,949,434 B2 | 4/2018 | Baes | |
| 10,004,176 B2 | 6/2018 | Mayerle | |
| 10,653,069 B2 | 5/2020 | Farley | |
| 2003/0003974 A1 | 1/2003 | Niermann | |
| 2003/0114207 A1 | 6/2003 | Wolters | |
| 2004/0132517 A1 | 7/2004 | Weihholdt et al. | |
| 2005/0277454 A1 | 12/2005 | Couture | |
| 2009/0045278 A1* | 2/2009 | Bech | D21D 1/306 241/297 |
| 2009/0098266 A1* | 4/2009 | Briz | B02C 13/22 44/605 |
| 2010/0291985 A1 | 11/2010 | Pohlmann | |
| 2011/0059782 A1 | 3/2011 | Harrington | |
| 2014/0364179 A1 | 12/2014 | Brinkmann | |
| 2015/0209794 A1* | 7/2015 | Lelas | B02C 13/205 241/27 |
| 2015/0373913 A1 | 12/2015 | Berry | |
| 2016/0044869 A1 | 2/2016 | Mayerle | |
| 2016/0044870 A1 | 2/2016 | Mayerle | |
| 2016/0113202 A1 | 4/2016 | Mayerle | |
| 2016/0150727 A1 | 6/2016 | Mayerle | |
| 2016/0150728 A1 | 6/2016 | Duquesne | |
| 2017/0079207 A1 | 3/2017 | Puryk | |
| 2017/0144165 A1* | 5/2017 | Latchireddi | B02C 17/1855 |
| 2017/0238463 A1 | 8/2017 | Van de Wege | |
| 2018/0070534 A1* | 3/2018 | Mayerle | A01D 41/1243 |
| 2018/0249641 A1 | 9/2018 | Lewis | |
| 2018/0317392 A1 | 11/2018 | Mayerle | |
| 2018/0368319 A1 | 12/2018 | Desmet | |
| 2020/0236850 A1* | 7/2020 | Mayerle | A01D 41/14 |
| 2020/0296896 A1* | 9/2020 | Mayerle | A01F 12/40 |
| 2021/0022289 A1 | 1/2021 | Berry | |
| 2021/0282329 A1 | 9/2021 | Hall | |

FOREIGN PATENT DOCUMENTS

| | | | |
|---|---|---|---|
| AU | 2011294851 A1 * | 4/2013 | B02C 13/20 |
| AU | 2014218502 | 9/2015 | |
| AU | 2017228663 | 10/2017 | |
| AU | 2018100350 | 5/2018 | |
| AU | 2019202177 | 10/2019 | |
| CN | 20244482 | 9/2012 | |
| DE | 382632 | 10/1923 | |
| DE | 1296943 B * | 5/1966 | B02C 13/205 |
| DE | 2319810 A1 * | 11/1974 | A01D 41/12 |
| DE | 3802260 A * | 8/1989 | B02C 13/205 |
| DE | 3824770 C * | 10/1989 | B02C 13/08 |
| DE | 102006040255 | 4/2007 | |
| DE | 102009012774 A1 * | 1/2010 | A01N 25/08 |
| DE | 102009042002 | 3/2011 | |
| DE | 102011088512 | 1/2013 | |
| DE | 102018212830 B3 * | 1/2020 | B02C 13/205 |
| DE | 102018131432 | 6/2020 | |
| EP | 1027820 | 8/2000 | |
| EP | 1191835 | 4/2002 | |
| EP | 1442649 | 8/2004 | |
| EP | 1905291 | 4/2008 | |
| EP | 2976937 | 1/2016 | |
| EP | 3520596 | 8/2019 | |
| EP | 4108062 A1 * | 12/2022 | B02C 13/08 |
| FR | 1189754 A * | 10/1959 | B02C 13/205 |
| GB | 1062209 | 3/1967 | |
| RU | 2727298 C1 * | 7/2020 | |
| WO | WO-8604266 A * | 7/1986 | B02C 13/205 |
| WO | WO-8705534 A * | 9/1987 | B02C 13/205 |
| WO | WO 01/01754 | 1/2001 | |
| WO | WO-2008138171 A1 * | 11/2008 | B02C 13/06 |
| WO | WO-2008156419 | 12/2008 | |
| WO | WO-2009100500 | 8/2009 | |
| WO | WO-2009100500 A1 * | 8/2009 | A01F 12/40 |
| WO | WO-2013085478 A1 * | 6/2013 | B02C 13/205 |
| WO | WO-2014127408 | 8/2014 | |
| WO | WO-2014127408 A1 * | 8/2014 | A01D 41/12 |
| WO | WO2017/008161 | 1/2017 | |
| WO | WO2018053600 | 3/2018 | |
| WO | WO-2018053600 A1 * | 3/2018 | A01D 41/12 |
| WO | WO2019178651 | 9/2019 | |
| WO | WO-2020160622 | 8/2020 | |
| WO | WO-2021155444 A1 * | 8/2021 | A01F 12/40 |
| ZA | 7706175 A * | 5/1978 | B02C 13/205 |

* cited by examiner

WEED SEED DESTRUCTION WITH IMPROVED WEAR CHARACTERISITICS

This application claims the benefit under 35 USC 119 (e) of Provisional application 62/988,514 filed Mar. 12, 2020, the disclosure of which is incorporated herein by reference.

This invention relates to a weed seed destructor which can be attached to a combine harvester so that weed seeds in the discharged chaff can be devitalized before being spread onto the ground. The invention also includes a combine harvester including the weed seed destructor.

BACKGROUND OF THE INVENTION

In U.S. Pat. No. 10,004,176 issued Jun. 26, 2018 U.S. Pat. No. 10,485,178 issued Nov. 26, 2019 and PCT Publication 2019/046973 published Mar. 14, 2019 there is disclosed an arrangement in which weed seeds are destroyed in the chaff from a combine harvester by a rotary mill causing repeated high speed impacts by a rotor mounted in one of a pair of side by side housings which accelerate the discarded seeds in a direction centrifugally away from the rotor onto a stator including a series of coaxial and radially spaced stator surfaces around the axis. Thus the discarded seeds rebound back and forth between the rotor and the stator to provide a plurality of impacts.

Also in PCT application PCT/CA2019/051320 published Apr. 9, 2020 as WO 2020/069602 there is disclosed an improved arrangement of stator for use in the above arrangements.

Combine mounted weed seed destruction units are becoming a common tool for destroying weeds retained in the crop while harvesting. Most of these weed seed control units are capable of devitalizing >95% of the weeds found in the chaff of a combine harvester. Research has shown that with 3 consecutive cycles of weed and grain removal significant reductions in herbicide can be obtained meaning huge saving for farmers.

As farmers are trying to capture as many weeds as possible in a standing crop environment, they lower the cutter bar height and ingest more soil than usual. Soils that contain high levels of silica are very abrasive and thus weed seed control mills are prone to wear.

Most seed control mills on the market today consist of a rotor with at least 2 rows of upstanding posts and three rings of stators with disrupting bars. It is known that a seed needs to be impacted four times at relatively high speed to obtain a 95% kill rate thus many of these mills operate at rotational speeds of up to 3000 rpm and with rotor bar tip speeds of up to 100 m/s.

The weed seed destructor with which the present invention can be used may be of many different types. Examples can include:

the arrangements shown and described herein;

U.S. Pat. No. 8,152,610 (Assignee: GRDC|Inventor: Harrington|2008) which details a large and heavy weed seed destructor mill which is mounted on a mobile frame, powered by a separate engine and is pulled behind a combine harvester. The mill is made with two counter rotating rotors. Chaff and weed seeds are collected from the combines sieves and blown from the harvester to trailing unit. The chaff and weed seeds enter the center of the rotating rotors and pass through the multiple counter rotating rings causing damage and devitalization to any seeds in the chaff. The residue is then spread out behind the trailed unit.

WO 2014/127408 (Applicant: GRDC|Inventors: Berry/Saunders|2014) which discloses a further development that was made following the GRDC machine discussed above. However, unlike the machine discussed above, it discloses a weed seed destructor unit which is mounted on the combine harvester behind the sieves. The weed seed destructor mill has a circular array of stationary bars positioned at an angle to the rotation of a rotor, such that there are blunt hits (i.e. impacts) to deflect seeds back into the rotation of the rotor while the seeds and the chaff pass through the destructor. The residue passes through multiple rings of stationary and rotating bars which inflict damage on any seeds in the chaff. The residue is then spread out to the sides of the harvester.

AU 2016/903873 (Applicant: Seed Terminator Holdings|Inventor: Berry|2016) which discloses a multistage hammer mill. Like the above it is mounted on the combine harvester behind the sieves. Rather than multiple rings of a circular array of stationary bars positioned at an angle to the rotation of a rotor it incorporates multiple rings of screens. Like a hammer mill, the rotor grinds, shears and impacts any seed in the chaff until it can pass through the screen aperture. The residue passes through multiple rings of stationary screens and rotating bars which inflict damage on any seeds in the chaff. The residue is then spread out to the sides of the harvester.

AU 2016/050802 (applicant: Tecfarm|Inventor: Lewis|2016) which discloses two parallel rotors with blunt flails radially extending on each rotor. It is shown that the effective tip diameter of the blunt flails are close to or intersecting each other. The rotors turn in opposing directions such that the tip velocity causes impact and devitalization of seeds in the chaff. The patent discloses the seed destruction device on a separate trailed unit however it is known that Tecfarm has mounted this type of destructor mill on a combine harvester at the rear end of the sieves.

Australian application AU200138781—Zani/Harvestaire in which the rotor teeth are carbide coated and individually removable for replacement.

U.S. Pat. No. 3,411,724—Noe issued Nov. 19 1968 which discloses a cage mill in which the edges of the mill's impact members are treated with a hardened steel or steel alloy.

The disclosure of each of the above cited patent documents is incorporated herein by reference. The concept herein can be used in any weed seed destructor design which uses a rotating body. In some cases the rotating body cooperates with a stator. The stator can include bars which deflect the seeds as they pass between the bars. The stator can include surrounding surfaces which cause the seeds to bounce back into the path of the rotor. In some cases the rotating body cooperates with another rotating body.

SUMMARY OF THE INVENTION

It is one object of the invention to provide an improved construction of a rotary mill which provides significantly increased economies based on reduced cost relative to wear.

According to the invention there is provided a weed seed destructor for mounting on a combine harvester having a separation system for separating harvested crop into a first material comprising straw and a second material comprising chaff and weed seeds, the weed seed destructor comprising:

an inlet receiving the second material comprising chaff and weed seeds;

a first plurality of surfaces and a second plurality of surfaces, both pluralities being mounted for engaging the second material comprising chaff and weed seeds;

the first and second surfaces being mounted for relative rotation such that the second material comprising chaff and weed seeds is impacted between said first and second surfaces during said relative rotation, the relative rotation occurring around an axis of rotation;

wherein at least one of the first and second plurality of surfaces have a characteristic such that a resistance to wear of at least one inner surface closer to the axis is less than a resistance to wear of at least one outer surface more distant from the axis.

The characteristic defined above can be provided by the body forming the surface itself or by a coating on the body so that it is a surface characteristic or a material characteristic.

Preferably the surfaces have a characteristic such that the total wear life, that is the useable life of the part, of an inner surface is matched to that of an outer surface. This can be done by surface, material, thickness or dimension variations.

This includes the ability to change the thickness of the part to create an equal wear life. Thus in an arrangement which use a screen such as in the multistage hammer mill shown in AU 2016/903873 (Applicant: Seed Terminator Holdings|Inventor: Berry|2016) an arrangement could be provided where an outer screen is thicker, for example by the order of 30%, than an inner screen to even the wear life between the two rings.

The characteristic can be provided by different characteristic of a hard surface coating material on the surfaces. The characteristic can comprise any one or more of hardness, thickness or composition of the hard surface coating material.

Alternatively the characteristic can be provided by a different characteristic of the bodies defining the surface. The characteristic of the body can comprise any one or more of hardness, thickness, composition or in this case dimension of the body.

That is the body defining the surface can be treated so that the outer surface or surfaces are harder than the inner surface or surfaces. In this way the material is more resistant to wear.

That is the body defining the surface can be formed so that the outer surface or surfaces are thicker than the inner surface or surfaces. In this way there is more thickness of the material to wear away before it exceeds an acceptable level.

That is the body defining the surface can be formed so that the outer surface or surfaces are formed of a different material than the inner surface or surfaces. In this way the material is selected so that the outer surfaces are more resistant.

That is the body defining the surface can be formed so that the outer surface or surfaces are wider than the inner surface or surfaces. In this way there is aa greater width of the material to wear away before it exceeds an acceptable level.

Preferably the characteristic of the inner surface closer to the axis is arranged relative to said outer surface more distant from the axis such that in use a wear life of each of said inner and outer surfaces is similar so that despite the greater levels of impact and wear applied to the outer surfaces, all surfaces wear away before it exceeds an acceptable level at the same rate and require to be replaced at the same time.

In a preferred arrangement, the surfaces of common characteristic form part of a common body so that the characteristic can be applied commonly to all surfaces of the body. In this way there can be provided an inner body of a first wear characteristic providing all the inner surfaces and an outer body of a different characteristic providing all the outer surfaces.

As set forth above this concept can be applied to many different designs of mill or destructor. However it is particularly applicable to arrangements where there is a rotor and stator and both are formed from coaxial annular rings of surfaces. The surfaces can be various different contact elements which may be bars of various cross-sections or may be other constructions such as screens.

Because the bars on the rotor are typically arranged in two or more concentric rings the tip velocity of the rotor bars is significantly different between an inner ring and an outer ring. Each ring of rotor bars accelerates the residue at different rates. Also the stator can be formed with three stator rings each including a plurality of bars which are arranged alternately around the three parts of the rotor and hence experience different impact velocities due to their differences in radial position and the tip velocity of the corresponding rotor bar. Because the residue flowing though the mills are often combined with soil or sand the radial position of the rotor or stator bars often results in different wear rates.

The present inventor has realized that this difference in velocity leading to different wear rates can be managed by providing different resistance to wear. That is the wear resistance is tailored to the amount of wear experienced, bearing in mind that the cost of wear resistance varies. In this way the wear resistance applied to the inner parts of the body which experience less wear is reduced to reduce the cost involved. Thus the amount of wear is balanced through the structure and the whole structure becomes worn and requires replacement at the same time.

In some embodiments, the first plurality of surfaces comprises a rotor which rotates around the axis so that the differential wear characteristic is applied to the rotor. In this case, the rotor comprises a set of inner surfaces surrounding the axis and a set of outer surfaces spaced radially outwardly from the set of inner surfaces and preferably the set of outer surfaces spaced radially outwardly from the set of inner surfaces comprises an annular ring of outer surfaces.

Preferably the set of outer surfaces comprising the annular ring of outer surfaces each have the resistance to wear thereof which is greater than the resistance to wear of the set of inner surfaces. In this way the surfaces of higher resistance to wear form part of a common body so that the wear characteristic can be applied commonly to all surfaces of the body in a common hardening process.

In some embodiments, the second plurality of surfaces comprises a stator. In this case, the stator comprises a set of inner surfaces surrounding the axis and a set of outer surfaces spaced radially outwardly from the set of inner surfaces and preferably the set of outer surfaces spaced radially outwardly from the set of inner surfaces comprises an annular ring of outer surfaces.

The rotor and stator preferably both use the differential wear concept but it will be appreciated that advantage can be obtained by using this concept only on one of the rotor and stator. That is preferably surfaces of both of the first and second plurality of surfaces have a surface characteristic such that a resistance to wear of an inner surface closer to the axis is less than a resistance to wear of an outer surface more distant from the axis. Preferably in this arrangement, the annular rings of the first and second pluralities are arranged alternately in the radial direction of the axis.

In another arrangement, the first plurality of surfaces comprises a plurality of blades extending radially outwardly from an inner end at or adjacent the axis to an outer end for rotation around the axis where an inner part of each blade has a surface characteristic such that a resistance to wear of the inner end closer to the axis is less than a resistance to wear of the outer end more distant from the axis.

In one embodiment, each inner surface and each outer surface is formed on a body, such as a bar parallel to the axis, with a part only of the body, facing toward a flow of the second material so as to engage the second material, having the surface characteristic. Other parts facing away from the material do not need to be hardened.

Preferably, each inner surface and each outer surface is formed on a body with a first part of the body, facing toward a flow of the second material so as to engage the second material, having the surface characteristic and a second part of the body, facing away a flow of the second material so as not to engage the second material, also having the surface characteristic so that the body is reversible, when the first part is worn, to place the second part facing toward the flow of the second material.

Preferably each body comprises a u-shaped bar but other shapes can be used.

Many different arrangement can be used for providing the required difference in wear characteristic. That is the different wear properties can be provided by one or more of:
- different thicknesses of a hard surface coating material.
- different compositions of a hard surface coating material.
- different hardness of a hard surface coating material.
- different microstructure modification of the surfaces.
- different material thickness in the radial direction.
- different material width in a direction transverse to the radial direction.
- different material hardness.

The use of surfaces of different transverse dimension can provide the higher wear resistance in the outer surfaces by the provision of more material to absorb the impacts. Thus the outer surfaces have a larger impact area.

The arrangement herein can provide one or more of the following advantages:
- To provide a seed control mill design in which all components of the mill wear evenly regardless of their radial position in the mill—so that all components can be serviced at the same time, for example after harvest or prior to next harvest.
  - to provide a seed control mill in which the hard surface coating is altered so that components with a greater radial distance from the center, have greater wear resistance.
  - to provide a seed control mill in which these components are double sided to provide reversibility and twice the life of a standard system.

Preferably the stator comprises a plurality of stator bars at angularly spaced positions around the axis of the rotor;
- each stator bar extending axially along the axis of the rotor and being spaced from a next adjacent stator bar to provide an axially extending space therebetween through which weed seeds can pass;
- each stator bar comprising an elongate member which is shaped in cross-section to define a first leg lying in or generally tangential to a cylindrical surface surrounding the axis of the rotor and a second leg extending outwardly from the cylindrical surface connected to the first leg at an apex at a leading end of the first leg relative to the direction of rotation of the rotor.

The stator bar can thus be L-shaped with one leg of the L-shape forming the first leg and the other leg of the L-shape forming the second leg.

The stator bar can also be U-shaped with a base of the U-shape forming the first leg and one leg of the U-shape forming the second leg. The other leg of the U-shape has no direct functioning impact on the seeds during use. However this arrangement allows the stator bar to be reversed after the second leg is worn by impacts with the seeds so that the other leg of the U-shape and the base of the U-shape then can be used to extend the wear life of the stator bar.

Preferably the apex is smoothly curved at the junction between the first leg and the second leg so it defines a radius of curvature where the radius of curvature can lie in the range 5 to 15 mm.

This radius of curvature thus provides a quadrant which simulates the exterior of a circular cylindrical body and any seeds engaging this curved junction portion will behave in the same manner as seeds engaging the exterior of a cylindrical bar. However the addition, to this cylindrical surface, of the first leg extending from the quadrant in the tangential direction acts to engage seeds and direct them back into the rotor for additional impacts. Also the addition to this cylindrical surface of the leg extending outwardly from the quadrant provides an additional impact on seeds as they pass by the bar in the outward direction, which would otherwise pass a rear quadrant without impact. Extensive testing of this arrangement with the addition of the tangential and outward legs provides a significantly increased seed kill rate relative to the conventional cylindrical rod due to the increased numbers of impacts.

Preferably the second leg extends outwardly from the apex to define a portion thereof beyond an outer end of the apex. In this way the formation of the stator bar can be obtained very easily by bending a sheet metal strip along a center line forms two legs where the first lies in the cylindrical surface and the second extends outwardly typically at right angles to the first. However the legs may be of different lengths with particularly the second leg being very short or hardly existent.

Also the two legs and apex portion may be formed on the exterior of a hollow tube as the formation of the legs as part of a tube provides an increased strength which may be desirable in some embodiments. That is the legs have a length from the apex to their edge in the radial plane greater than the thickness of the material from which they are formed and are not merely the surfaces of a solid body Preferably the second leg lies at an angle to the first leg which is at right angles to the first leg. However the second leg can be bent through more than 90 degrees so that it is at an angle to the first leg which is less than right angles to the first leg. This forms the apex portion into a smooth part cylindrical body wrapped around from the first leg to the second leg. It will be appreciated that the impacts from the seeds on the stator bars occur over those parts facing inwardly into the rotor including the first leg and the apex portion. Impacts on the second leg do not interfere with the path of the seeds as they are already moving outwardly from the stator.

Alternately the second leg can be bent at an angle less than 90 degrees so that the angle between the first and second leg is greater than 90 degrees. In this case all impact surfaces will tend to reflect the seed back to the rotor creating a higher devitalization rate with higher power requirements.

Typically the stator bars lie in a line parallel to the axis so that the apexes are directly parallel to the rotor axis. However the stator bars can be inclined to the line parallel to the axis at the cylindrical surface so that they are all tilted to the left or right. Where the bars are parallel to the axis, typically the second legs lies in an axial plane of the axis of the rotor.

Preferably the width of the first leg in the cylindrical surface is in the range 10 to 20 mm. Preferably the spacing between each bar and the next at the cylindrical surface lies in the range 10 to 50 mm. The width of the first legs relative to the spacing between the trailing edge of each bar and the apex of the next controls the amount of material which is allowed to escape between the bars. Increasing the length of the legs and/or decreasing the spaces increases the amount of material which remains inside the stator and thus increases the number of impacts and the power requirement for moving the material. Conversely the power can be reduced by increasing the proportion of space to leg but with consequent reduction in impacts and hence reduction in seed destruction. These ratios can be selected depending on the amount and type of seeds to be treated. Typically the width of the second leg in the outward direction is in the range 10 to 20 mm.

Preferably the outer edge of each of the second legs lies in a common imaginary cylinder surrounding said cylindrical surface as this makes the manufacture of symmetrical stator bars by bending sheet metal strips a more effective method.

Preferably the stator bars extend along a full height of rotor so that the height of the stator matches that of the rotor. However stators can be stacked one on top of another where the rotor is of increased height.

Preferably the first and second legs of the stator bar comprise portions which are flat as this allows a simple bending of a flat strip to form the bars.

Preferably each of the stator bars comprises a sheet metal plate which is bent to form the legs. However other materials and methods of manufacture can be used.

Preferably the stator construction includes a stator support member and a plurality of angularly spaced stator portions mounted on the support member where the stator support member is cylindrical so as to surround the axis of the rotor and the stator portions are part cylindrical with each of the plurality of stator portions extending around a part only of the periphery of the support member. Each such portion includes a plurality of the stator bars.

In this arrangement preferably there is provided a discharge opening between each stator portion and the next.

This construction of separate replaceable stator portions allows a plurality of the stator portions to be provided having different characteristics which can be selected for different weed seed sizes and amounts. The selection of the portion also can be used to change power requirements.

In particular, the different characteristics or the portions to the used in any circumstance relate to the length of the first leg of the stator bars around the axis and/or the spacing between the stator bars around the axis.

This construction of part cylindrical stator portions allows the portions to be hard surface coated as a separate component from the support member. To provide an effective mounting of the separate portions, preferably each of the stator portions comprises mounting edges at angularly spaced ends of the portion for attachment to a rail of the support member. This can be used with a support structure which comprises a top and bottom ring around the axis of the rotor with a plurality of rails parallel to the rotor axis.

Preferably the rotor comprises a hub carrying rotor blades defining said rotor surfaces where the blades are pivotally mounted about an axis parallel to the rotor axis so as to act as flails.

Preferably the rotor comprises a plurality of posts where an outer surface of each post has a leading edge which is closest to the cylindrical surface and tapers away from the cylindrical surface toward a trailing edge.

In accordance with another important feature of the present invention which can be used independently or with any of the above features, the rotor comprises a plurality of blades where the blade is symmetrical with a leading edge and a trailing edge so that the blade can be reversed when worn on the leading edge.

Preferably the rotor comprises a plurality of posts where the post is symmetrical with a leading edge and a trailing edge so that the rotor can be reversed when worn on the leading edge of the post. Optionally the rotor posts can be hardened or hard surfaced on the leading edge and trailing impact surfaces in a symmetrical pattern.

In this arrangement also the stator bar can be symmetrical with a leading edge and a trailing edge so that the stator bar also can be reversed when worn on the leading edge. Optionally the stator bars can be hardened or hard surfaced on the leading edge and trailing impact surfaces in a symmetrical pattern.

In order to take best advantage of this reversibility, preferably there are provided first and second rotors each associated with a respective one of first and second stators and the first and second rotors are driven in opposed directions so that the blades, posts and stators of one can be replaced by the blades, posts and stators of the other when worn on the leading edges thereof.

In one construction the rotors are arranged side by side driven about parallel preferably upstanding axes and driven in opposed directions.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The structure of the weed seed destructor is shown and described in detail in the above published PCT application WO 2020/069602 to which reference may be made for any details not included herein.

Figure 1:
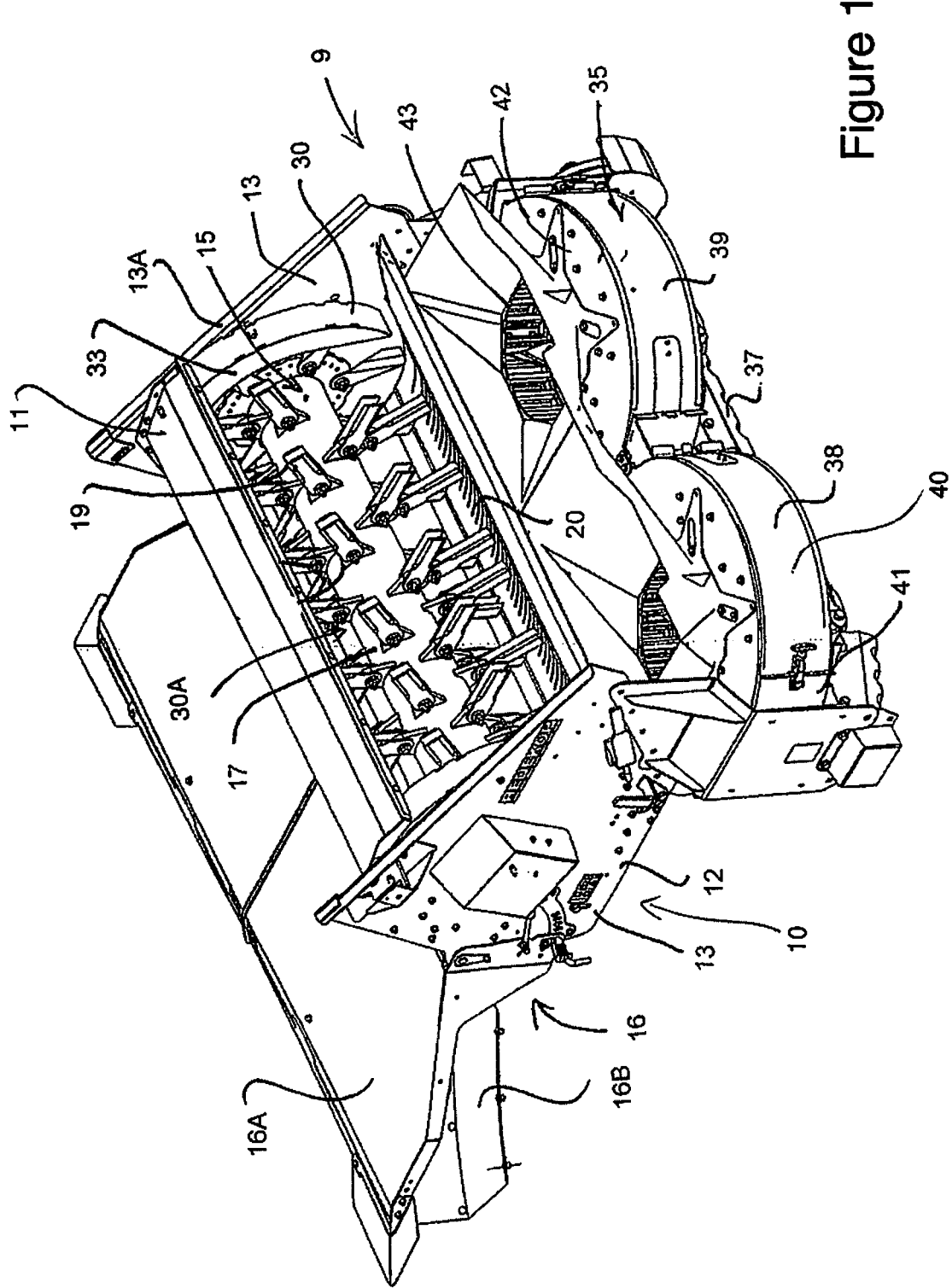
FIG. 1 is an isometric view of a prior art apparatus shown in the above mentioned PCT publication WO 2020/069602 for destruction of weed seeds according to the present invention which is arranged in a first embodiment where the rotary mill section is mounted at a position on a combine harvester at the rear of the sieve so as to discharge the chaff and destroyed seeds towards the straw chopper's tailboard to enhance residue spreading to both sides of the combine harvester.

The apparatus herein is shown in FIG. 1 mounted on a combine harvester carried on ground wheels and including harvesting components of a conventional nature the rearmost one of which is the sieve which discharges chaff and discarded seeds including weed seeds to the rear edge of the sieve.

The combine harvester includes a chopper and discharge arrangement 9 shown in FIG. 1 is basically as shown in U.S. Pat. No. 6,840,854 issued Jan. 11, 2005 of Redekop, the disclosure of which is incorporated herein by reference. The chopper thus comprises a housing 10 defined by a top wall 11, a bottom wall 12 and two end walls 13. The end walls 13 include attachment means 13A for attachment of the housing to the outlet of a combine harvester for discharge of straw and optionally chaff from the combine harvester into an inlet opening 15 of the housing 10. The bottom wall 12 defines a semi-cylindrical portion extending from the inlet 15 to an outlet through which chopped straw and air is discharged at relatively high velocity for spreading across the field in a wide spread pattern.

Within the housing is mounted a hub 17 which is carried on suitable bearings mounting a shaft for rotation about a hub axis at a center of the housing so that blade members 19 carried by the hub sweep around within the housing to entrap straw fed through the inlet 15 and to carry the straw and air past stationary blades for chopping and for discharge through the outlet. The stationary blades 20 are mounted on the housing at a position approximately midway between the inlet 15 and the outlet so that the blade members 19 sweep between the stationary blades in a cutting action.

In this arrangement of the chopper, there is provided three axially spaced sections of the chopper assembly including a first fan section 30 at one end of the hub 17 and the second fan section at the other end of the hub 17. In-between the two narrow fan sections 30 is defined a center section 30A which provides the whole of the cutting action.

The chopper and spreading assembly 9 is arranged to be mounted at a rear straw discharge of the combine harvester and includes the housing 10, the rotor 17 mounted in the housing 10 for rotation around a generally horizontal axis and carrying the plurality of chopper blades 19 for chopping the discharge material.

At the exit is provided the material spreading assembly which can be the form of a tailboard 16A with guide fins 16B for receiving the chopped material and spreading the material to the rear and sides of the combine harvester.

In the Figures the seed destructor which includes two separate destructor elements 38, 39 side by side each including a housing 35 with base 37 and an outer surface 40 upstanding from the base and extending to an outlet or discharge mouth 41. The base and outer surface are covered by a top planar cover panel 42 which has an opening 43 Inside a center part of the spiral which defines a central inlet for feeding the material from the sieve containing the chaff and weed seeds onto a rotor 44 mounted on a hub 45. Around the hub 45 is provided a plurality of pivot pins or bolts 46 each carrying a pair of flail blades 47. The flail blades extend from an inner end connected to the pin 46. The flails can retract inwardly by pivotal movement in the event of impact with a larger object. Thus the blades are pivotally mounted about an axis parallel to the rotor axis so as to act as flails.

The rotor 44 includes the hub 45, the flail blades 47 and two outer rings 60 and 62 of bars 61, all of which rotate around the axis of the hub.

Around the rotor is provided a stator formed by three stationary annular coaxial cylinders 51, 52 and 53 with cylinder 51 inside the cylinder 52. The stator cylinders are carried on the top cover 42 so that they hang down from an upper annular flange fixed to the cover. The cover forces the weed seeds to contact the stator and rotor thus devitalizing the seed.

Figure 3:
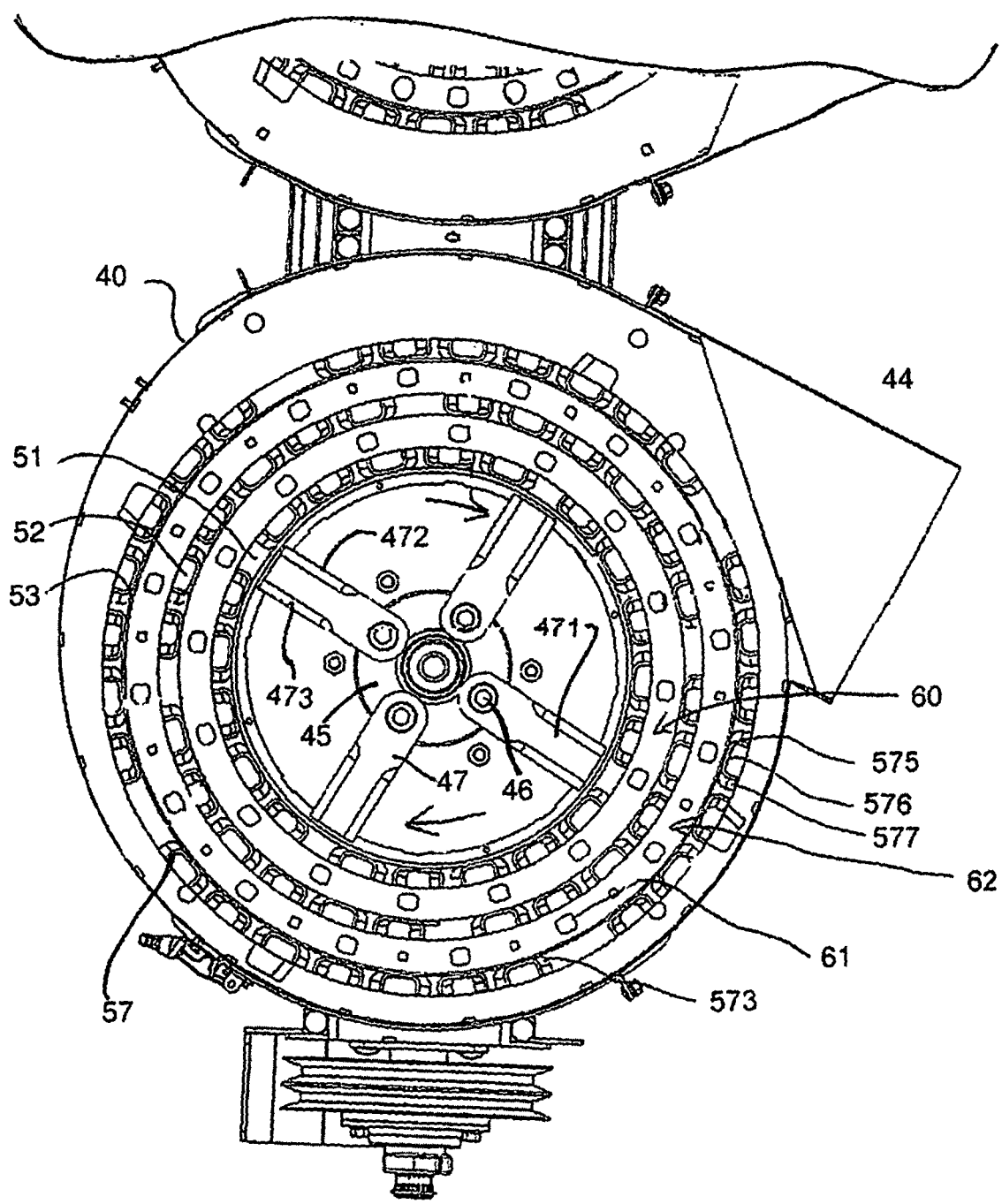
FIG. 3 is a cross sectional plan view of one rotary mill of FIG. 2.
Figure 4:
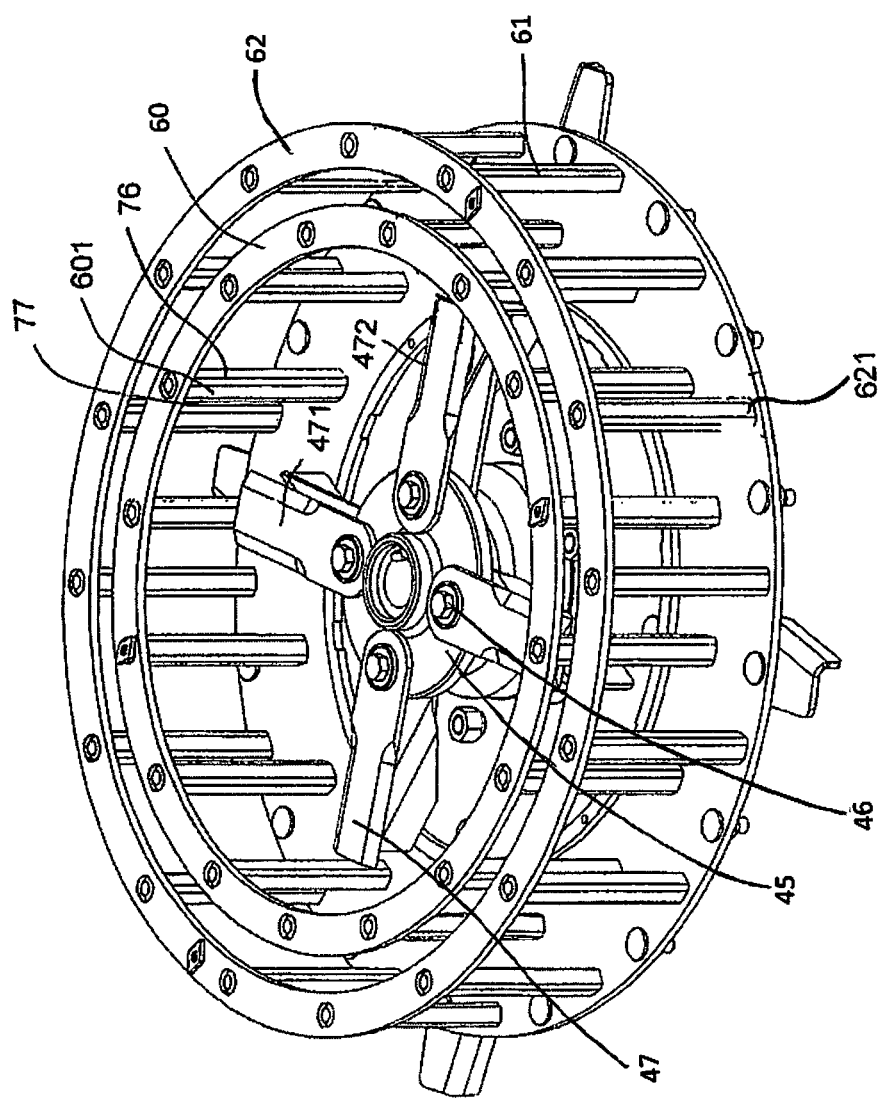
FIG. 4 is an isometric view of the stator frame of FIG. 2.

Each stator cylinder is of the construction shown in FIG. 3 and includes a top flange, a bottom ring parallel to the flange and a plurality of upstanding connecting posts or bars 57 to form a rigid structure.

The rings 60 and 62 of the rotor are coaxial with and located between the stator rings 51, 52 and 53.

In operation, the rotor flails 47 acts to suck chaff and weed seed into the mills and accelerate and direct the material across the inside surface of the inner annular stator ring 51 to impact, shear and force some of the material through the spaces between the bars 57.

The stator ring 53 has the same structure as the stator rings 51 and 52 but of increased diameter. The outer stator ring therefore operates in the same manner under the rotation impetus on the material from the posts of the rotor ring 62 to impact and shear the material and then to allow any remaining material remaining on the inner surface of the outer stator to escape outwardly. The material escaping is flung outwardly and angularly against the outer surface 40.

Each stator bar 57 comprises an elongate member which includes three impact surfaces which can be varied in size and length to vary the number of impacts a weed seed encounters as it passes through each stage of the mill. The stator bar is preferably U-shaped in cross-section with a base 576 and two legs 575 and 577 facing outwardly from the blades with the apexes 573 curved with a radius. Thus the stator bars also can be reversed when worn on the leading edge.

The arrangement herein thus provides a stator bar which includes a tangential surface, an apex at a leading edge of the tangential surface and a third surface which is generally radial whereas previous arrangements typically before have had either a tangential or radial or apex, but not all three and thus provides an advantage over, and differentiator from, the prior art, enabling higher weed seed devitalization rates at lower power requirements.

The stator bar is preferably formed by bending a strip of sheet metal along a center line or approximately at the center line to form the legs 575 and 576 with a smooth curve 573 interconnecting the legs. The apex 573 defines a radius of curvature which can lie in the range 5 to 15 mm and more preferably of the order of 7 mm. However the same surfaces can be formed on the outside of a body which is a solid bar, not a bent strip or on the outside of a hollow bar.

A seed is carried along in the direction by the rotation of the rotor blade so that it moves around the axis with some outward movement under centrifugal force. Some seeds impact the leg 575 on its inner surface. Some seeds pass through the opening between the trailing end of the leg 575 and the apex 573 of the next stator bar. These seeds and accompanying material will escape outwardly from this stator to the next stator or to the wall 40. Some of that material may engage the radial outwardly extending surface of the leg 575 so as to change direction but generally any material impacting the bar outside of the apex will escape outwardly. Some of the seeds and material will impact the bar 57 at the apex 573.

The second leg 577 typically lies in an axial plane of the axis of the rotor but in some cases where the bend in the strip forming the bar is greater than 90 degrees, the leg 572 may be close to or even alongside the leg 571. The legs are typically flat as the only bend in the strip is at the apex.

It will be noted that the rotor has three components defined by the blades 47, the rings 60 and 62 which are at different spacing from the axis so that the blades 47 are closest to the axis, the ring 60 is outward of the blades and the ring 62 is outward of the ring 60. Thus these components rotate at the same angular velocity but at different linear velocities related to the difference in radius, It will be noted that the stator has three components defined by the ring 51, the ring 52 and the ring 53 which are again at different spacing from the axis so that the ring 51 is closest to the axis, the ring 52 is outward of the ring 51 and the ring 53 is outward of the ring 52. These components are stationary but it will be appreciated that the velocity of the weed seeds and other particles impacting these components and driven by the rotor varies in proportion to the radius from the axis X.

Figure 5A:
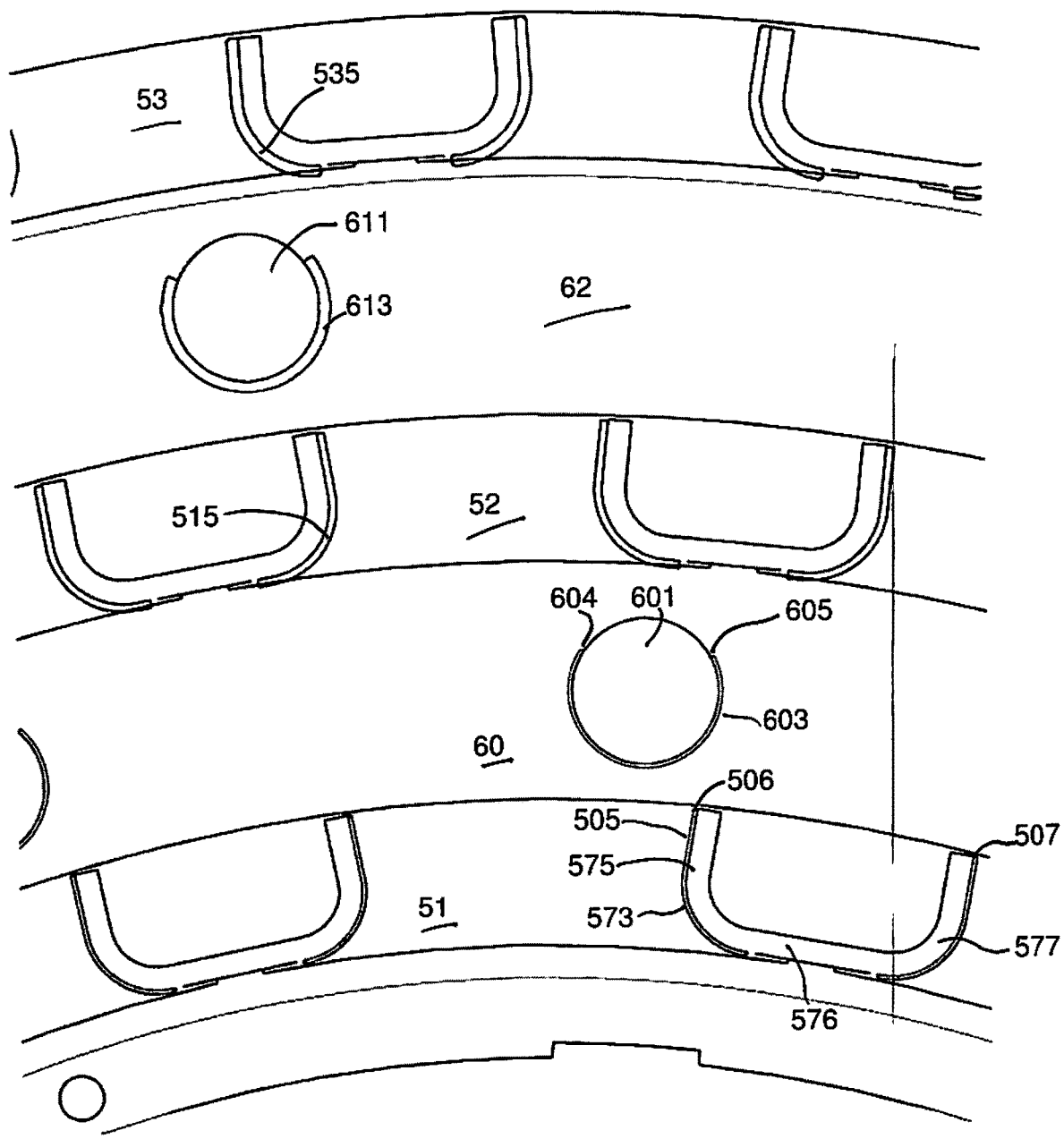
FIG. 5A is a detailed view of a portion of FIG. 3 which shows rotor and stator components according to the present invention with increasing coating thickness as the components radial position from the rotor center increases.

As shown in FIG. 5A, each of the bars 57 of each of the stator rings is coated on the front surface of the base 576 and on the outside faces of the legs 575 and 577 by a coating material which provides a resistance to wear. This material is shown at 505 on the bars in the ring 51 and the coating 505 extends from an edge 506 at the end of the leg 575 to an edge 507 at the end of the leg 577. The coating extends around the curve 573 and across the base 576 and covers the whole height of the bar.

The bars in the ring 52 have a coating 515 and again the coating 515 extends from an edge 506 at the end of the leg 575 to an edge 576 at the end of the leg 577. The coating extends around the curve 573 and across the base 576 and covers the whole height of the bar of the ring 52. Further the bars in the ring 53 have a symmetrical coating 535.

The rings 51, 52 and 53 are each formed separately from one another so that these can be separated and removed individually from the structure. Each ring is formed as an integral body including the top and bottom flanges and the interconnecting bars. Each integral ring can therefore be manufactured with the bars thereof having characteristics required to match the requirements of the ring concerned.

In particular, the surfaces of the bars which are exposed to contact with the second material are covered by the coating which is selected so that the first plurality of surfaces defined by the bars of the rings of the stator have a surface characteristic such that a resistance to wear of the inner surfaces of the bars of the ring 51 closer to the axis is less than a resistance to wear of the outer surface of the bars of the ring 52 more distant from the axis. Similarly the bars of the rings 52 and 53 of the stator have a surface characteristic such that a resistance to wear of the inner surfaces of the bars of the ring 52 closer to the axis is less than a resistance to wear of the outer surface of the bars of the ring 53 more distant from the axis.

Similarly the bars 601 and 602 of the rotor rings 60 and 62 are coated by a layer 603 and again the coating 603 extends from an edge 604 part way around the circular bar 601 from an outer tangent around the inwardly facing side of the bar 601 to an edge 605 again spaced from the outer tangent. The coating extends around the bar 601 to protect those areas that are impacted by the second material and covers the whole height of the bar 601 of the ring 60.

The rings 60 and 61 are each formed separately from one another so that these can be separated and removed individually from the structure. Each ring is formed as an integral body including the top and bottom flanges and the interconnecting bars. Each integral ring can therefore be manufactured with the bars thereof having characteristics required to match the requirements of the ring concerned.

Again the coating 603 is arranged to have lesser wear characteristics than the coating 613.

Figure 5B:
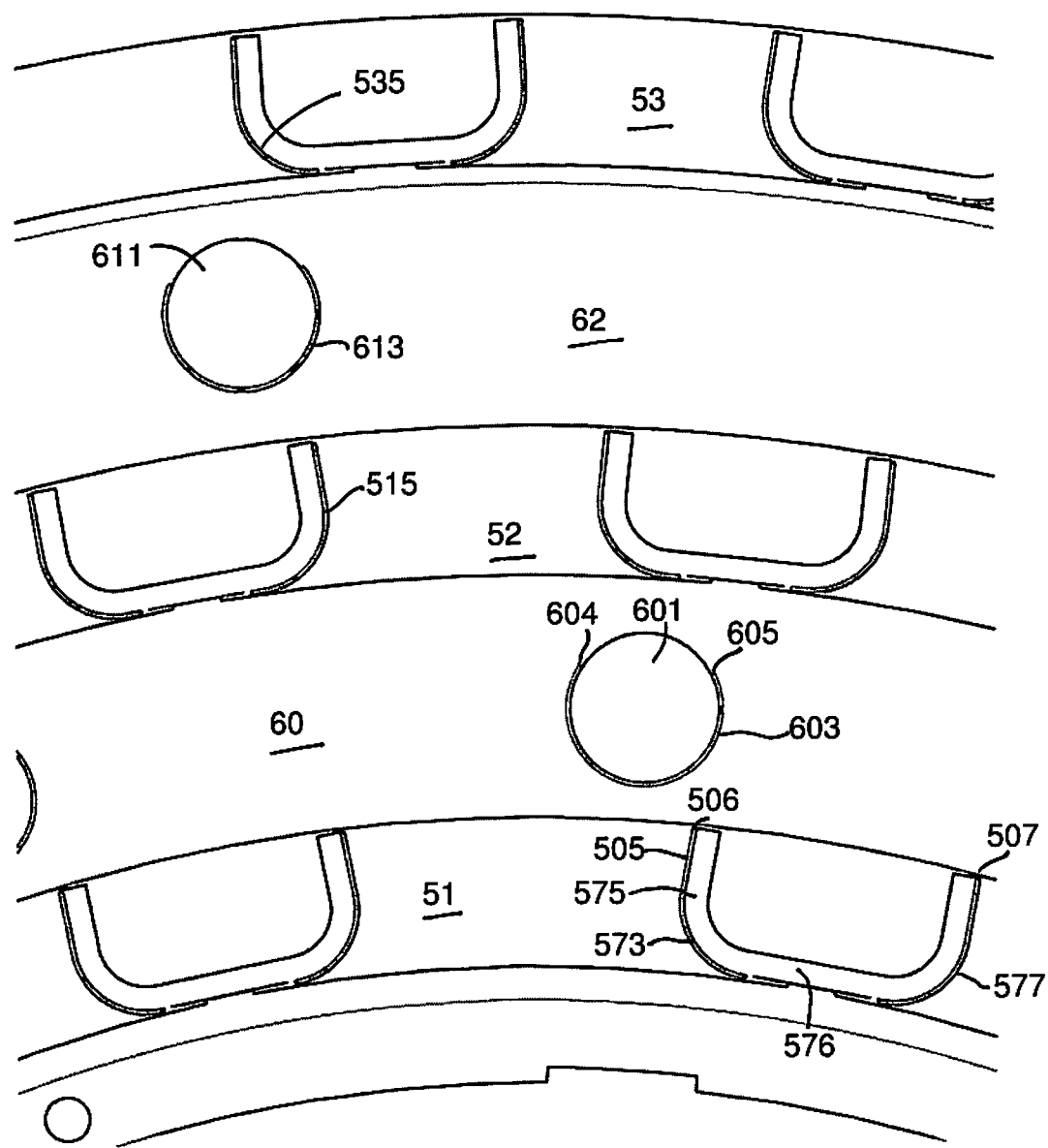
FIG. 5B is a detailed view of a portion of FIG. 3 which shows rotor and stator components according to the present invention with increasing coating hardness or different composition as opposed to thickness as the components radial position from the rotor center increases.

The difference in wear characteristics can be provided by modifying the coating or the layers by any one of many different techniques known to provide difference in wear characteristics. These can include:
- -a- Where the different wear properties are provided as shown in FIG. 5A by different thicknesses of the hard surface coating material.
- -b- where the different wear properties are provided as shown in FIG. 5B by different compositions of the hard surface coating material so that the thickness is the same but the material is different.
- -c- where the different wear properties are provided as shown in FIG. 5B by different hardness of a hard surface coating material so that the thickness is the same but the material hardness is different.
- -d- where the different wear properties are provided as shown in FIG. 5B by different microstructure modification of the surfaces so that the thickness is the same but the material is different.

Figure 5C:
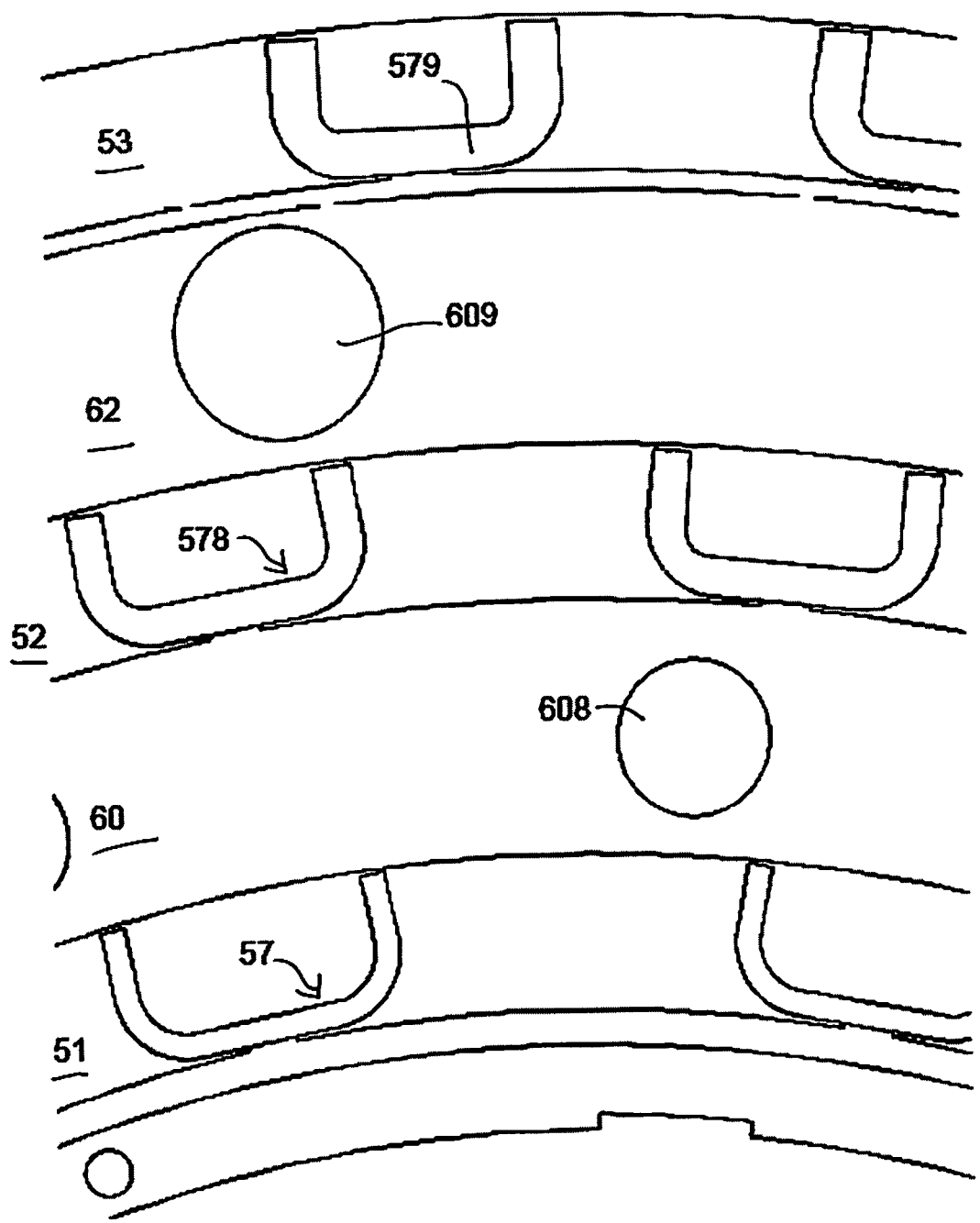
FIG. 5C is a detailed view of a portion of FIG. 3 which shows rotor and stator components according to the present invention where the components themselves are of increasing thickness as the components radial position from the rotor center increases.
Figure 5D:
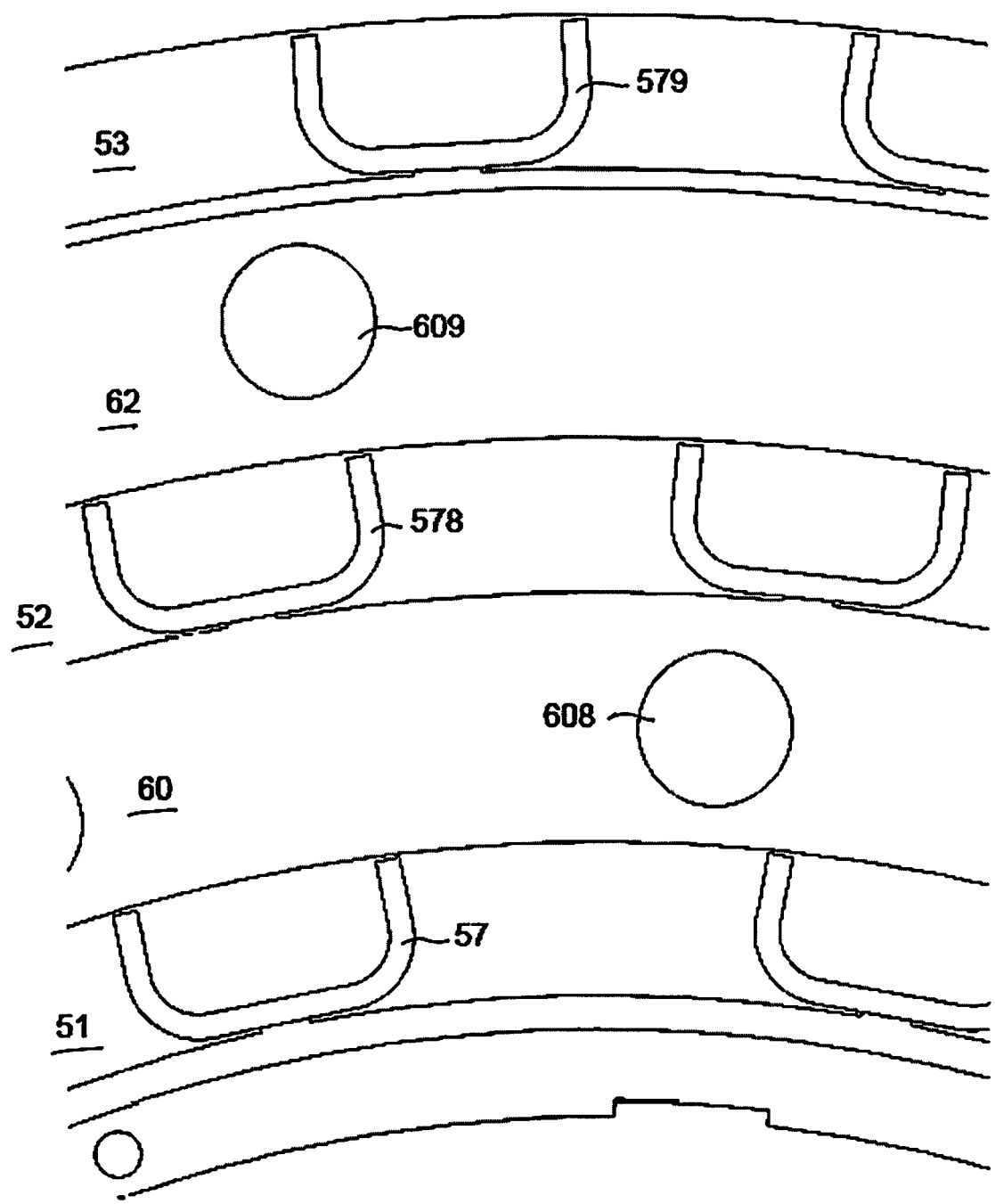
FIG. 5D is a detailed view of a portion of FIG. 3 which shows rotor and stator components where the components themselves are of increasing hardness or different composition as opposed to thickness as the components radial position from the rotor center increases.

The difference in wear characteristics can be provided by modifying the bars themselves which are free from a coating material by any one of many different techniques known to provide difference in wear characteristics. These can include:
- -a- Where the different wear properties are provided as shown in FIG. 5C by different thicknesses of bars 57, 578 and 57 of the stator and bars 608 and 609 of the rotor.
- -b- where the different wear properties are provided as shown in FIG. 5D by different compositions of the bars themselves so that the thickness is the same but the material is different. Thus the bars 57, 578 and 579 of the stator. have materials of increasing hardness, as do the bars 608 and 609 of the rotor
- -c- where the different wear properties are provided as shown in FIG. 5D by different hardness of the bars themselves so that the thickness is the same but the material hardness is different.
- -d- where the different wear properties are provided as shown in FIG. 5D by different microstructure modification of the bars themselves so that the thickness is the same but the material is different.

-e- where the different wear properties are provided as shown in FIG. 5D by different microstructure modification of the bars themselves so that the thickness is the same but the material is different.

Figure 5E:
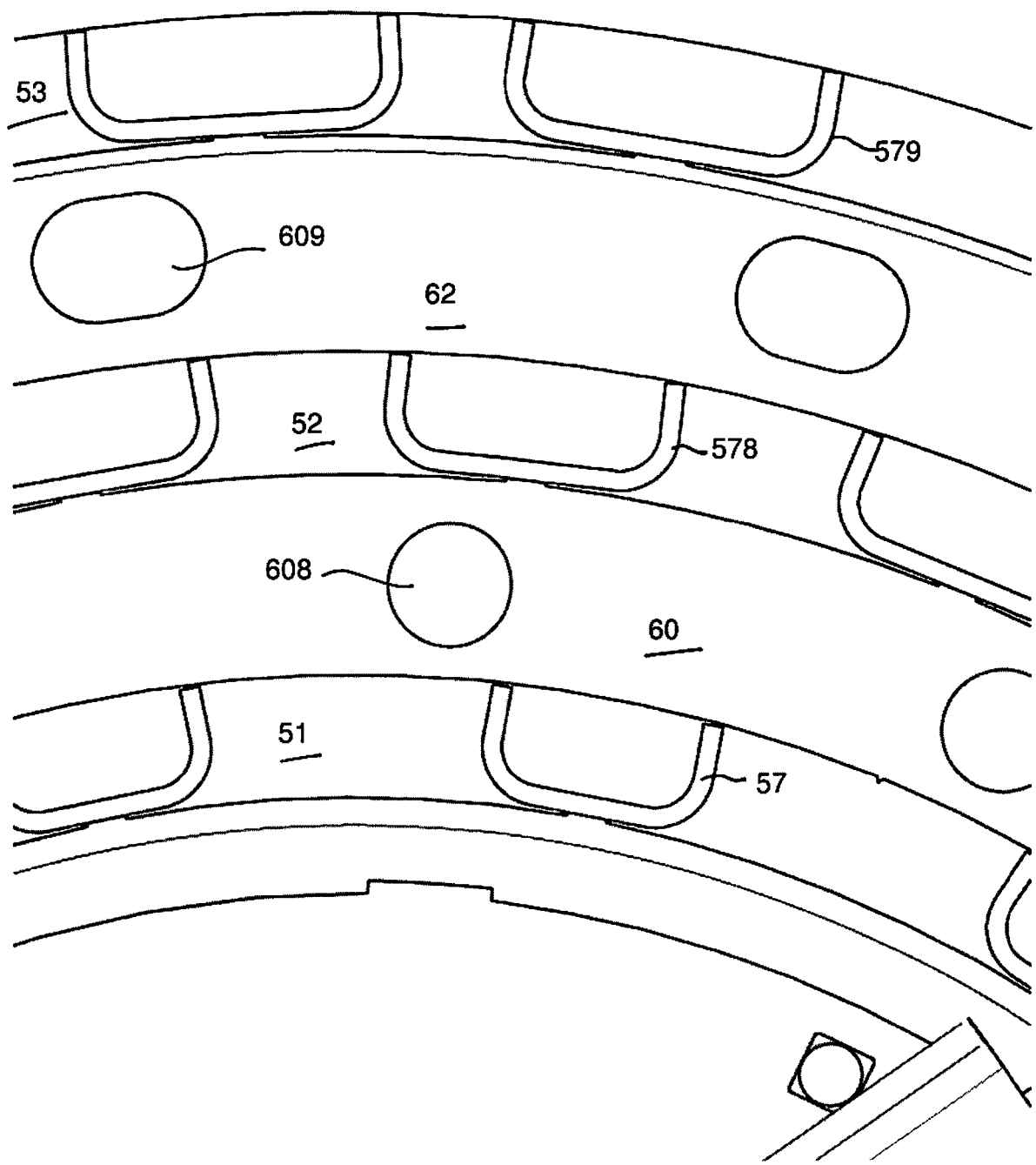
FIG. 5E is a detailed view of a portion of FIG. 3 which shows rotor and stator components according to the present invention where the components themselves are of increasing transverse dimension as the components radial position from the rotor center increases.

-f- where the different wear properties are provided as shown in FIG. 5E where the components 57, 578 and 579 of the rotor are themselves of increasing transverse dimension as the components radial position from the rotor center increases. That is the radial dimension of each of the bars increases to provide additional material to increase the resistance to wear of the bars proportionally to the spacing from the axis. Similarly the bars 608 and 609 of the rotor are of increasing width.

Figure 6:
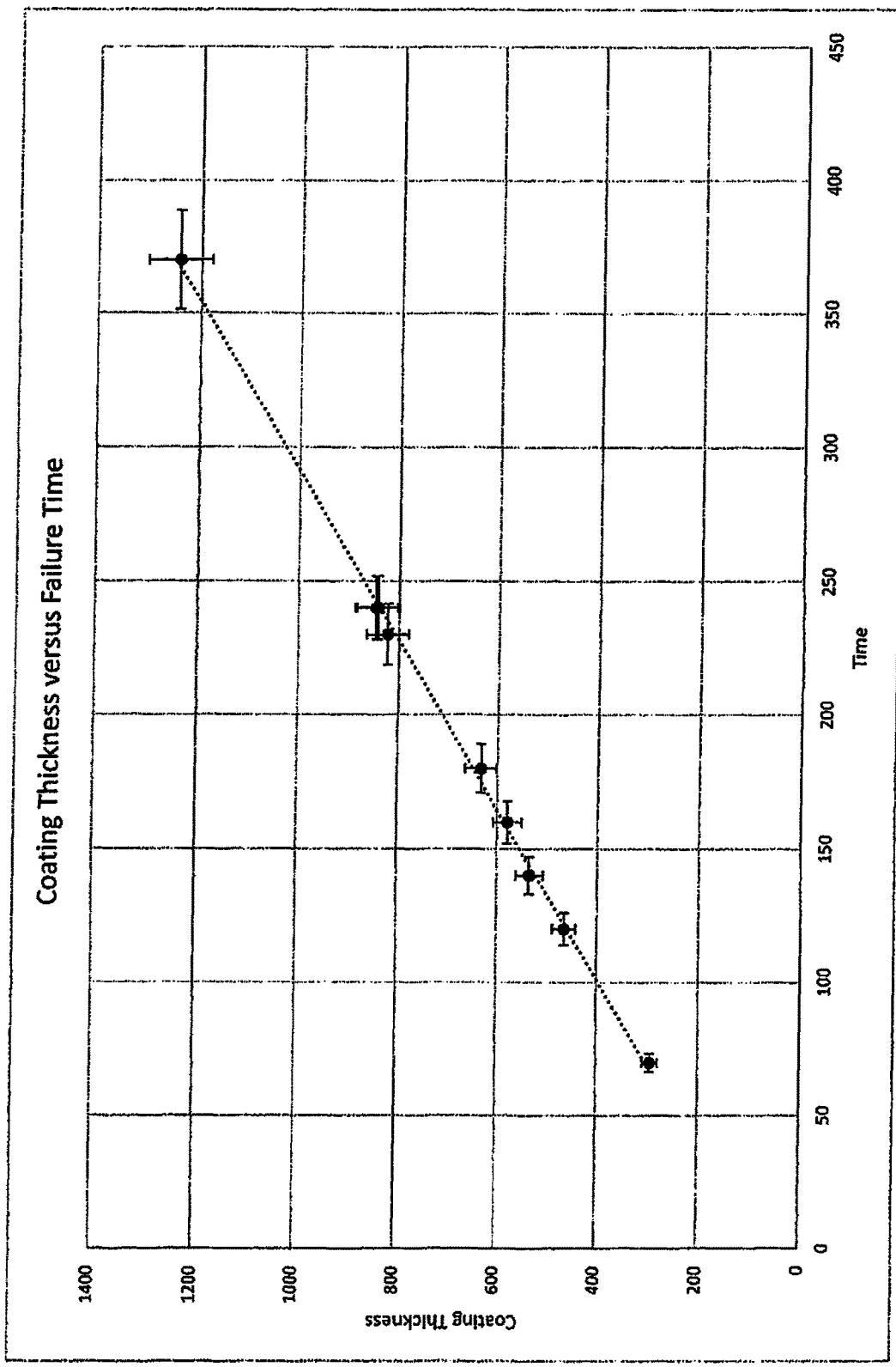
FIG. 6 is a graph of Coating thickness vs Time to fail coating in relation to the arrangements above according to the present invention which shows a linear relationship.

FIG. 6 is a graph of Coating thickness vs Time to fail coating which shows a linear relationship.

Figure 7:
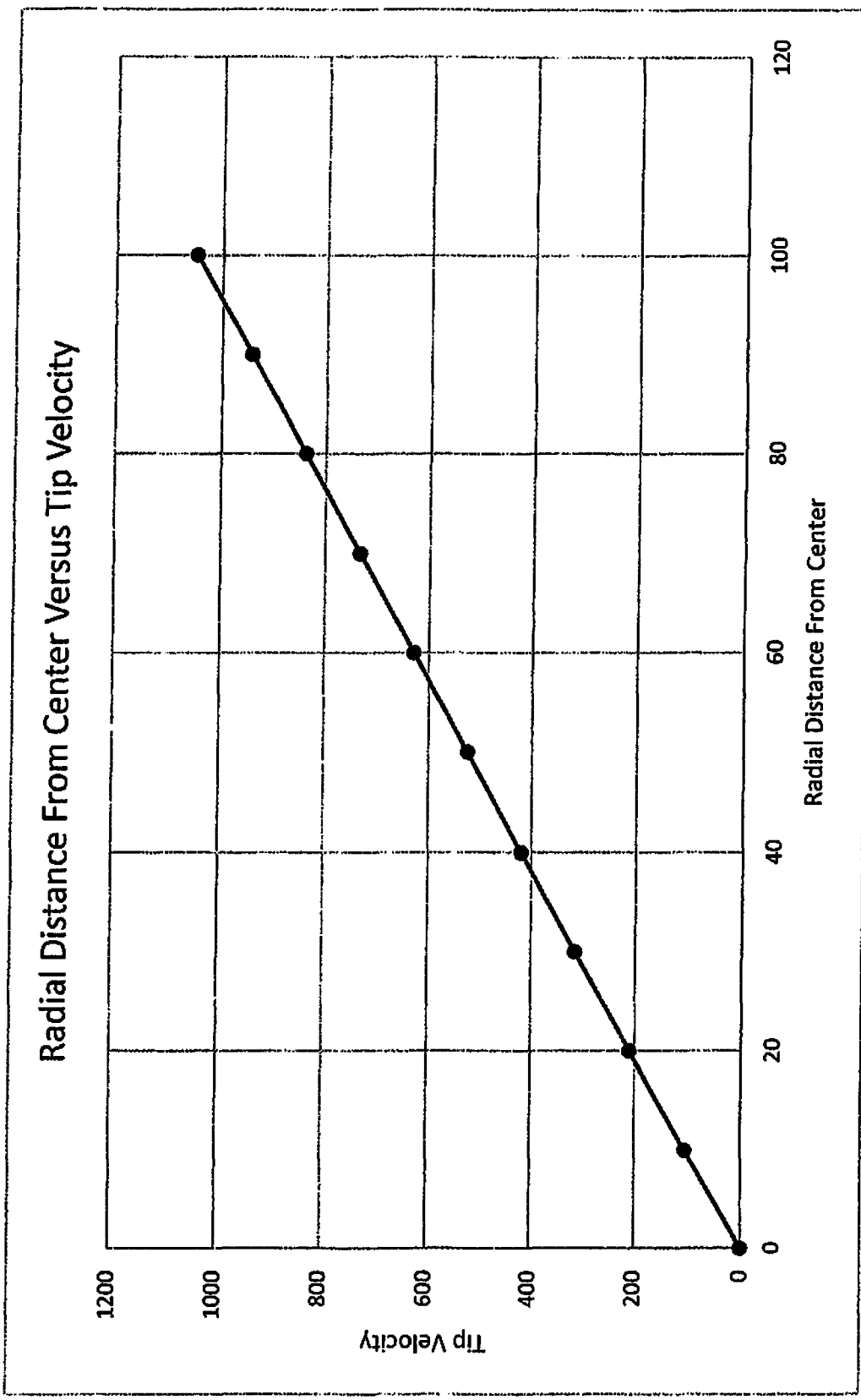
FIG. 7 is a graph of Tip Velocity vs radial location in relation to the arrangements above according to the present invention.

FIG. 7 is a graph of Tip Velocity vs radial location

Figure 8:
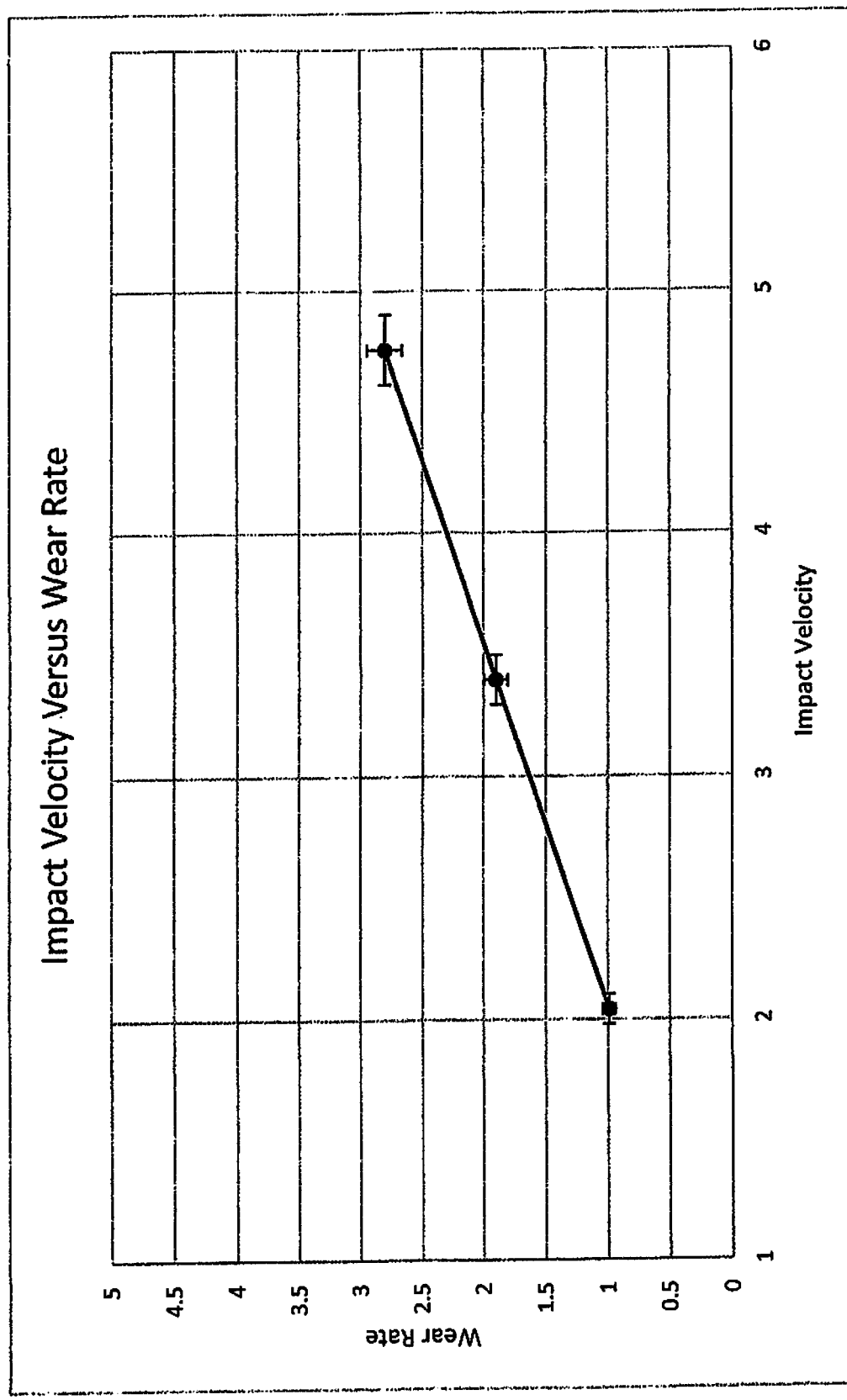
FIG. 8 is a graph of Velocity vs Wear Rate in relation to the arrangements above according to the present invention.

FIG. 8 is a graph of Velocity vs Wear Rate

Figure 9:
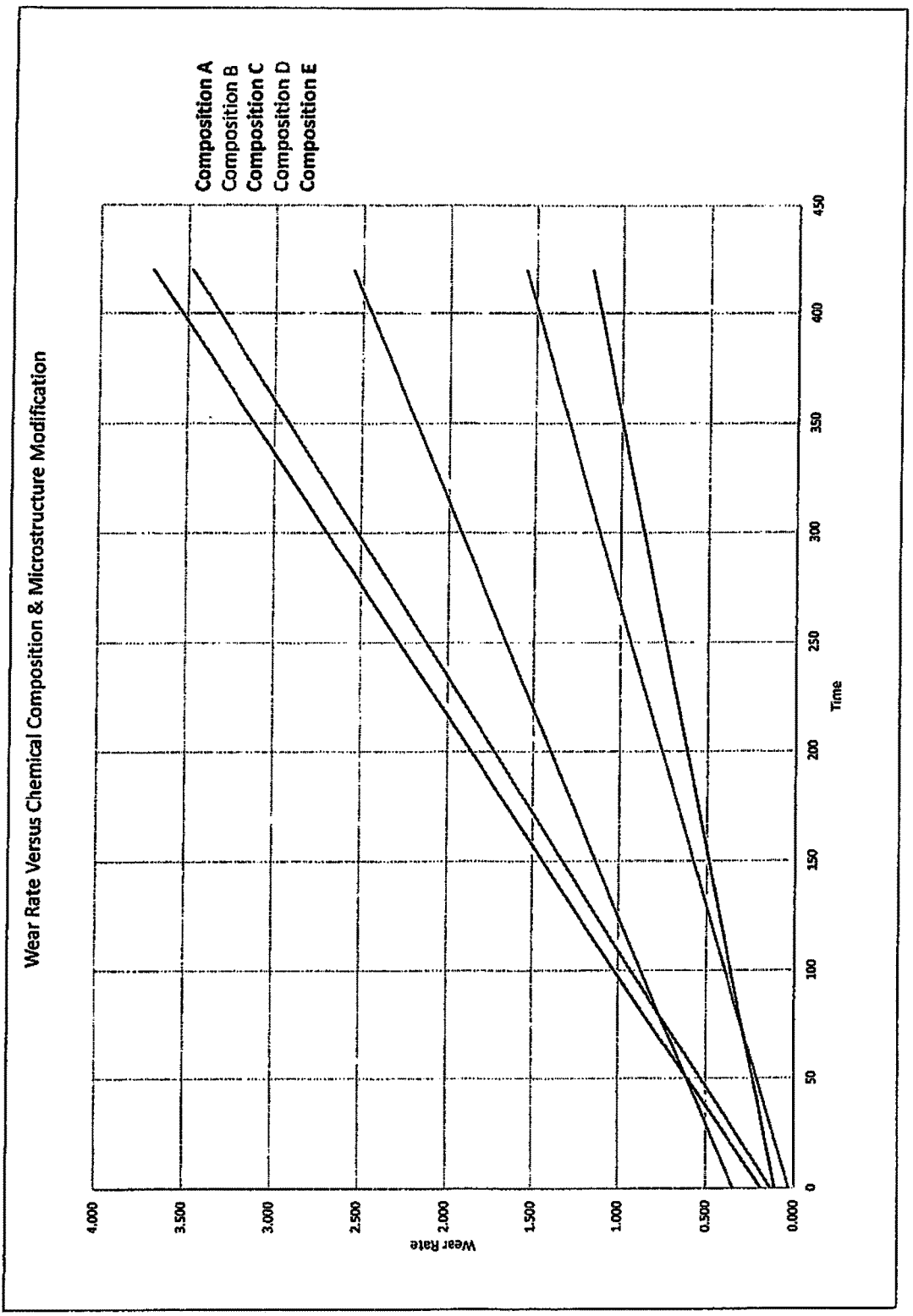
FIG. 9 is a graph of Wear Rate vs Chemical Composition and Microstructure Modification in relation to the arrangements above according to the present invention.

FIG. 9 is a graph of Wear Rate vs Chemical Composition and Microstructure Modification.

Figure 10:
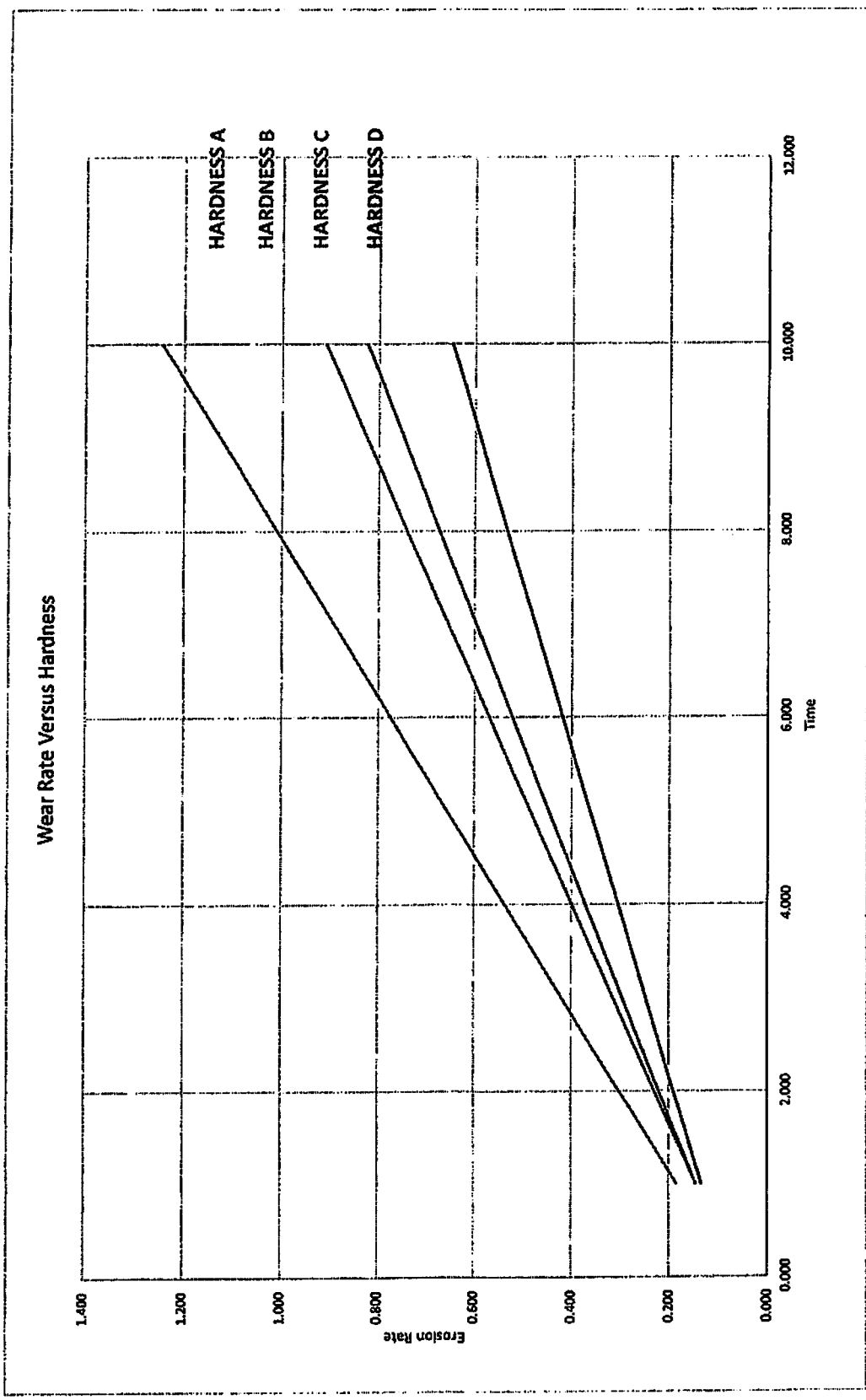
FIG. 10 is a graph of Wear Rate vs Hardness in relation to the arrangements above according to the present invention.

FIG. 10 is a graph of Wear Rate vs Hardness.

These graphs show that the resistance to wear can be selected using any one of the above techniques and that the resistance to wear is a linear graph of the characteristics of the material allowing the wear characteristics to be selected proportionally to the radius and hence to the linear velocity of the particles as they impact the respective rings.

It will be appreciated that the rings forming the rotor or the rings forming the stator can be formed with the characteristics defined above or more preferably both are. However in some designs this may not be necessary depending on wear patterns.

As set forth above this concept can be used in many different designs of mill and the wear pattern can be determined and the location of the requirement for hard coating determined. The concept concerned is that the wear resistance characteristic is increased depending on the radius of the component from the axis and it will be appreciated that this can be applied to any of the above cited designs.

Figure 2:
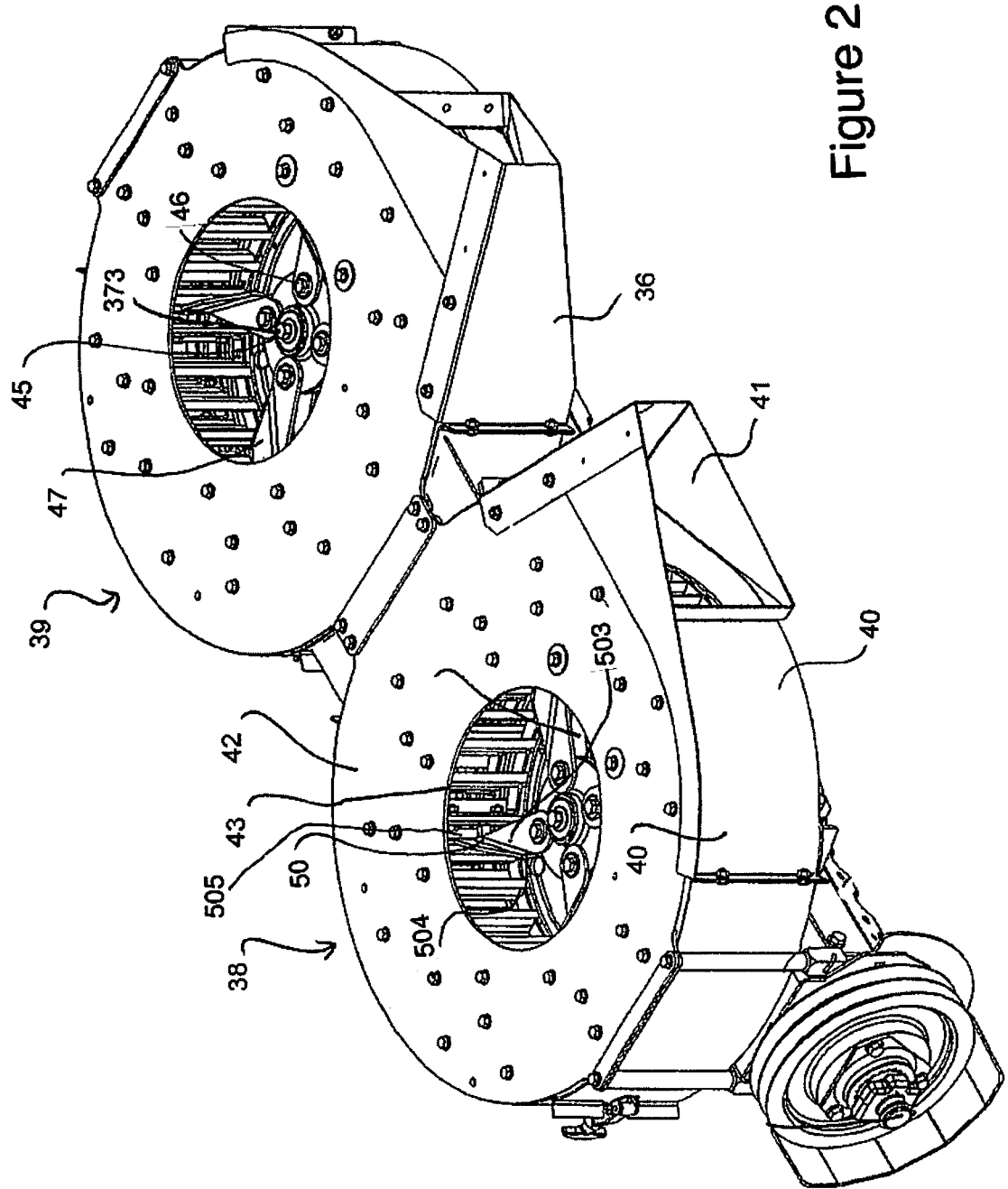
FIG. 2 is an isometric view of the apparatus for destruction of weed seeds of FIG. 1 which shows the structure of the rotary mill.

Also as shown in FIG. 2 the blade 47 includes the fan blade surface 50 which lies in a plane parallel to the axis X and has a height matching that of the bars so that the leading surface 503 of the fan blade 50 acts to accelerate the weeds and other particles so that they impact the bars of the stator ring 50.

The same concept can also be optionally applied to the surface 503 so that an inner portion 504 of the surface 503 is coated or formed with a wear resistance less than that of an outer portion 505 due to the fact that the portion 505 is further from the axis and hence moving at a higher linear velocity and thus receptive to a higher wear from these particles. It will be appreciated that the bars of the ring 51 are designed to return some of the particles inwardly so that there are repeated impacts on some particles between the blade portion 50 and the inner ring 51. This same concept can be used with any rotating blade of the mill where there is a significant difference in radius between one portion and another. The different characteristics can be obtained by any one of the above techniques.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A weed seed destructor for mounting on a combine harvester having a separation system for separating harvested crop into a first material comprising straw and a second material comprising chaff and weed seeds, the weed seed destructor comprising:
   a housing arranged to be mounted at a location on the combine harvester for receiving through an inlet of the housing a feed material containing separated chaff and weed seeds separated by the combine harvester from harvested crop;
   a rotor mounted in the housing for rotation in a direction of rotation about a rotor axis, said at least one rotor including rotor surfaces thereon for engaging the feed material and for accelerating the feed material in a direction outwardly from the axis of the rotor;
   said rotor comprising cylindrical coaxial inner and outer rotor rings of rotor bars where the rotor bars of each of the inner and outer rotor rings are parallel to the axis and angularly spaced around the axis;
   a stator for engaging the weed seeds in the accelerated feed material;
   said stator comprising cylindrical coaxial inner and outer stator rings of stator bars where the stator bars of each of the inner and outer stator rings are parallel to the axis and angularly spaced around the axis;
   wherein the inner and outer rotor rings and the inner and outer stator rings are arranged coaxially and sequentially from the axis with each ring spaced radially from the next so as to cause weed seeds to be devitalized by multiple impacts back and forth between the bars of the rings;
   wherein each ring of said inner and outer rotor rings and said inner and outer stator rings is formed as an integral body for common replacement of the ring with the bars of the ring;
   wherein the bars of the rings include a hard surface coating material on surfaces thereof;
   wherein the bars of the outer rotor ring of the rotor have a characteristic defined by a hardness, thickness or composition of the hard surface coating material thereon such that a resistance to wear thereof is greater than a resistance to wear of the bars of the inner rotor ring of the rotor;
   and wherein the bars of the outer stator ring of the stator have a characteristic defined by a hardness, thickness or composition of the hard surface coating material thereon such that a resistance to wear thereof is greater than a resistance to wear of the bars of the inner stator ring of the stator.

2. The weed seed destructor according to claim 1 wherein the rotor further comprises a plurality of blades extending radially outwardly from an inner end at or adjacent the axis to an outer end for rotation around the axis and wherein an inner part of each blade has a surface characteristic such that a resistance to wear of the inner end closer to the axis is less than a resistance to wear of the outer end more distant from the axis.

3. The weed seed destructor according to claim 1 wherein each bar has the hard surface coating material on a part only of the bar which part faces toward a flow of the second material so as to engage the second material.

4. The weed seed destructor according to claim 1 wherein each bar has the hard surface coating material on a first part only of the bar which part faces toward a flow of the second material so as to engage the second material and on a second part of the bar, facing away a flow of the second material so as not to engage the second material so that the bar is reversible to place the second part facing toward the flow of the second material.

5. The weed seed destructor according to claim 4 wherein each bar comprises a u-shaped bar with a base of the u-shaped bar facing inwardly toward the axis.

6. A combine harvester comprising:
a separation system for separating harvested crop into a first material comprising straw and a second material comprising chaff and weed seeds;
and the weed seed destructor according to claim 1.

\* \* \* \* \*